July 17, 1928. 1,677,659
J. W. SAFFOLD
CHAIN TOOL
Filed Feb. 26, 1926   3 Sheets-Sheet 2

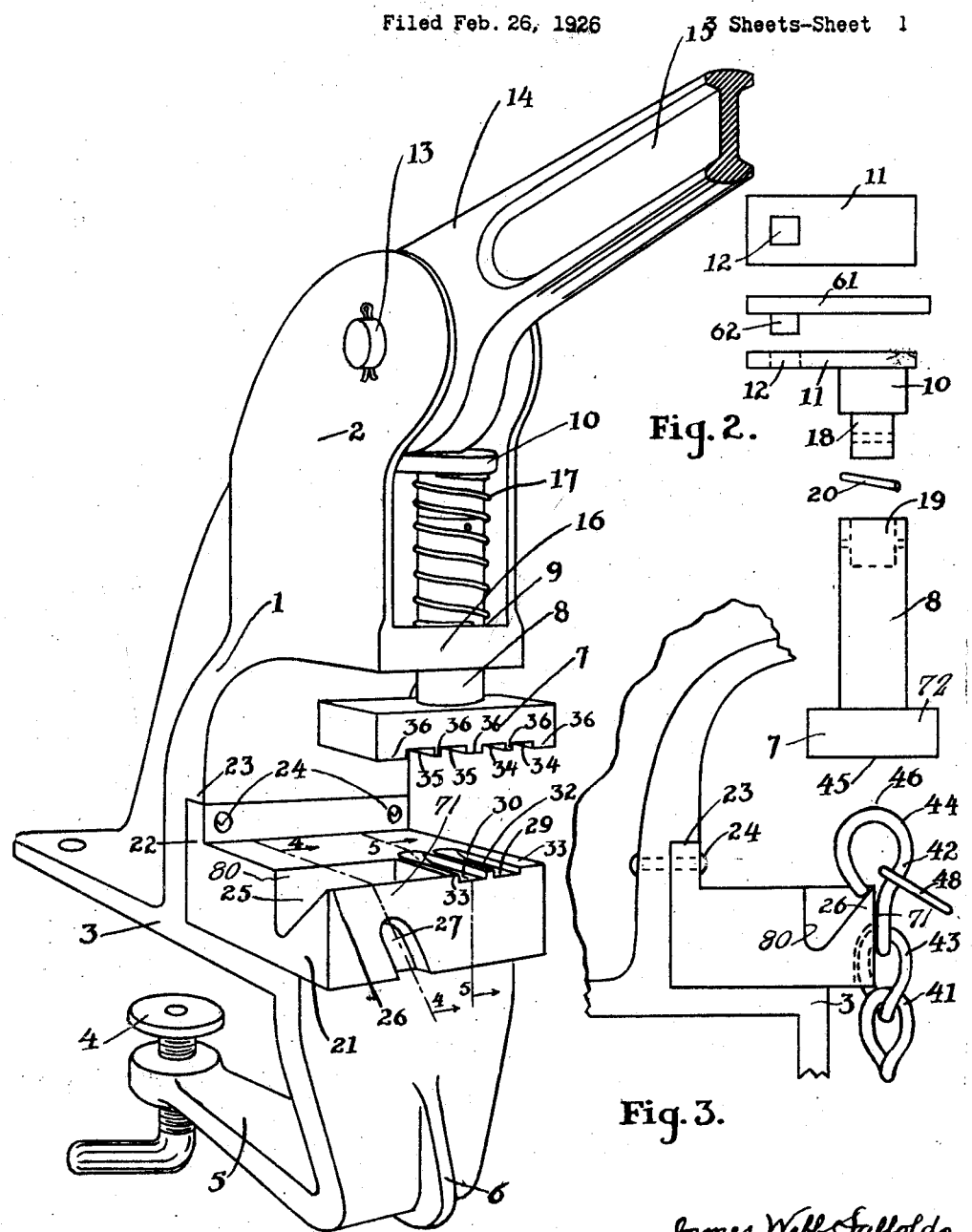

James Webb Saffold
Inventor

By Frank M. Slough
His Attorney

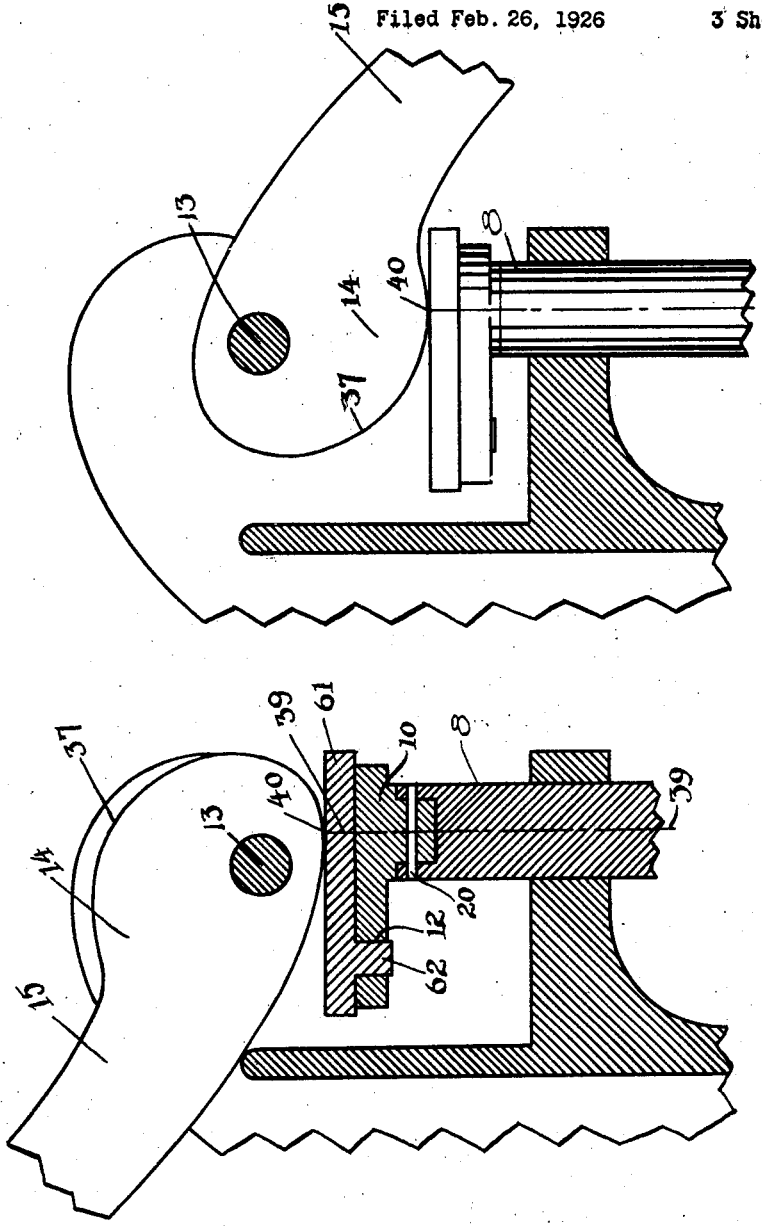

Patented July 17, 1928.

1,677,659

UNITED STATES PATENT OFFICE.

JAMES WEBB SAFFOLD, OF CLEVELAND, OHIO.

CHAIN TOOL.

Application filed February 26, 1926. Serial No. 90,782.

My invention relates to improvements in chain tools of the type adapted to open and close the eye portions of wire chain links, for which applications for Letters Patent were filed in the United States on June 1, 1925 and September 7, 1926, Serial Nos. 34,060 and 133,758, respectively.

An object of the present invention is to provide an improved tool by the use of which the detachment and attachment of cross links of automobile non-skid chains may be accomplished efficiently and expeditiously.

Another object of my invention is to provide an improved tool of the class described capable of being hand operated, and to open and close the eyes of chain links of various sizes with a minimum of manual effort, in an efficient, efficacious manner.

Another object of my invention is to provide, in tools of this general character, an improved camming mechanism adapted to be actuated by hand in such a way that the thrust effort of the cam will always be exerted in a given longitudinal direction at a single point on the cammed surface for all operative camming positions of the hand lever.

Another object of my invention is to accomplish the opening of the eyes of chain links without the necessity of holding the chain link in alignment during the opening operation against the power of the opening tool.

Another object of my invention is to provide a tool of the class described which is adjustable to operate upon chains of varying sizes without the necessity of disassembling the machine, replacing the operating jaws thereof or making such major adjustments of the machine as are now commonly required in machines of this general character.

Other objects of my invention and the invention itself will be rendered apparent by reference to the following description of certain embodiments of my invention which are illustrated in the drawings accompanying and forming a part of this specification.

Referring to the drawings:

Fig. 1 shows a view of an embodiment of my invention;

Fig. 2 is a view of disassembled portions of the plunger element of the said embodiment;

Fig. 3 shows, in side elevation, a fragment of the embodiment of Fig. 1 with a chain link portion disposed ready to be operated upon by the tool;

Figs. 11 and 12 illustrate, partly in section, the formation of the cam surface of the cam lever and the uniform position of the camming contact relative to the head of the plunger rod of my improved mechanism.

Figure 4:
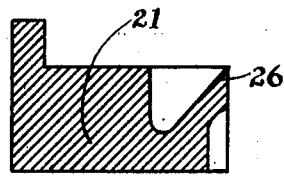
Fig. 4 is a section taken on the line 4—4 of Fig. 1.
Figure 5:
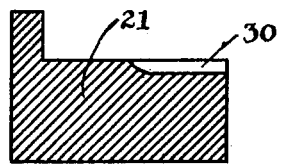
Fig. 5 is a section taken on the line 5—5 of Fig. 1.
Figure 6:
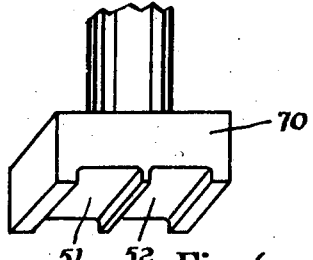
Fig. 6 is a view of a fragment of a form of plunger which may be employed in a second embodiment of my invention.
Figure 7:
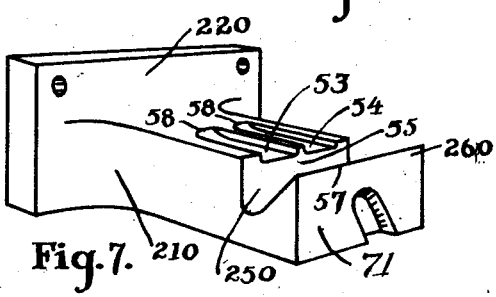
Fig. 7 is a view of the anvil of the said second embodiment.

The embodiment of my invention employing the plunger of Fig. 6 and platen of Fig. 7, with the exception of those differences in construction of plunger and platen shown in Figs. 6 and 7, is understood to be like the embodiment of Fig. 1, the same press frame and actuating mechanism being adaptable for use in the case of both embodiments of my invention herein illustrated.

Referring now to the drawings and particularly to Figs. 1 to 5, inclusive, and 8 to 12, inclusive, illustrating the first embodiment of my invention in various aspects, and in all of which figures like parts are designated by like reference characters, at 1, I show a press frame having a press head 2, base 3 and clamp 4, screw threaded through an inwardly projecting arm 5 of the base 3 and adapted to cooperate with the under side of the base 3 to clamp a bench board or like support therebetween. A strengthening rib 6 is preferably provided in the arm 5 at the bend thereof to prevent distortion of the arm during use of the tool. In Fig. 2, I show various elements of a plunger, comprising a plunger platen 7 carried on the lower end of a plunger rod 8 journaled at 9 in the press head 2, the said rod being headed at 10, its head portion comprising a flange 11 perforated, for a purpose later to be related, at 12. Journaled on a transverse pin 13, which extends transversely of the press head and through the bifurcated upper portion thereof, I provide a cam 14 having preferably an integral handle 15 extending therefrom and adapted to rotate the cam 14 upon the pin 13 whenever proper cam rotating manual effort is exerted upon the handle 15, which then operates as a cam lever. The plunger rod is journaled in the bridge portion 16 of the head and is adapted to be forced upwardly by the effect of the retractile spring 17, which is compressed between the said bridge and the said flanged head 10 of the rod. The flanged head 10 is separable from the rod 8, having an end portion 18 of reduced cross section insertable within an end recess 19 of the lowermost rod portion and rigidly secured thereto by a pin 20 which may be of any desired form, such as a rivet or a cotter pin.

Figure 8:
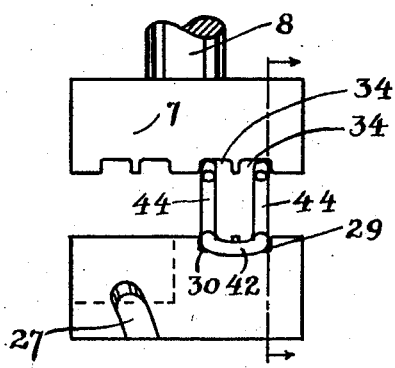
Fig. 8 is a front elevation of the plunger and anvil of the embodiment of Fig. 1 with an interposed chain link adapted to be operated thereby.

At 21, I show an anvil seated on the forward upward surface of the base 3, having a rearwardly extending portion 22 projected below a shoulder 23 in the press frame, and which is secured to the press frame by a plurality of machine screws 24. The anvil block 21 is provided with a wedge-shaped recess 25 extending transversely of the anvil in the forward portion thereof adjacent the side. The forward wall of the recess and the forward wall of the anvil provide an upwardly extending wedge shaped horn 26, of chisel cross-sectional formation which provides a horn having its forward or outer wall 71 forming a part of the forward wall of the anvil, which horn is recessed in its forward face at 27, as illustrated, the recess extending downwardly in a preferably oblique direction, as best illustrated in Fig. 8. The inner wall or side 80 of the recess 25 is disposed on a substantial vertical plane substantially parallel with the front side or wall 71 of the anvil. I provide a plurality of grooves 29 and 30, herein illustrated as a pair, with an intermediate rib 32 and end shoulders 33, on the upper surfaces of the anvil and disposed at right angles relative to the recess 25. The plunger carries on its lower end the platen 7, which is provided with a plurality of grooves 34 and 35 extending from front to rear across its lower face, the grooves 34 of which are disposed directly above and are aligned with the grooves 29 and 30 of the anvil, this relation being best illustrated in Fig. 8. Between the different grooves 34 and 35 and laterally of the outer grooves thereof, I provide a plurality of ribs or shoulders 36, defining the grooves.

The plunger platen 7 is preferably rectangular in form and a forward portion 72 thereof extends forwardly of the plane of the vertical side or face 71 of the anvil, the plane of the vertical side of the anvil passing through the center of the plunger and platen.

Figure 9:
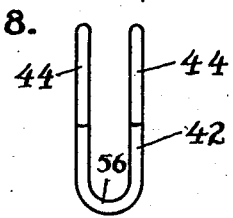
Fig. 9 is a plan of the chain link shown in Fig. 8.

Referring now particularly to Figs. 11 and 12, I show in Fig. 11 the plunger rod 8 in its uppermost position which it assumes when the apparatus is not in use, and in Fig. 12 I show it in its lowermost position, as when the tool is being used to operate upon a chain link, as illustrated in Figs. 8 and 9. In these figures, it will be observed that the curvature of the camming face 37 of the cam 14 is so related to the center of rotation of the cam, at 38, and the axis 39 of the plunger 7 that regardless of the amount of rotation of the cam 14 about its center 38, the contact of the cam face 37 is had with the plunger head 10 at a point in the line of the axis 39, such point being indicated in the drawings at 40. The curve illustrated for the face 37 of the cam is a developed curve and is effective to accomplish the downward thrust of the cam upon the plunger rod 7 in a direction coincident with the axis of the plunger at all times, and I contribute the effectiveness of the operation of my improved machine tool to accomplish the work to which it is to be put, with a minimum expenditure of manual labor, to the precise character of this curve relative to its center of rotation and the positioning thereof relative to the axis 39 of the plunger rod. I believe I am the first to accomplish a downward movement of a plunger, resulting from a rotation of a cam, in precisely this way and with precisely this effect, and I propose to claim broadly my invention resident therein.

The apparatus of that embodiment of my invention illustrated in Figs. 1 to 5, inclusive, and 8 to 10, inclusive, is adaptable for use in both opening and closing the eyes of chain links, Fig. 3, illustrating the positioning of the chain 41 having a link 42 positioned so as to be opened by the wedge horn 26, and it will be observed that the adjacent link 43 suspended from the link 42 takes a position within the recess 27. The obliquely disposed recess accommodates the twisted chain link freely, so that the eye 44 of the link may be disposed, as illustrated in Fig. 3, in a vertical position with the opening thereof lowermost and so that the contact portion 45 of the platen 7 will contact with the portion of the eye 44 indicated at 46, which is substantially opposite the opening 47 of the eye and in the plane of the face 71 of the anvil.

I find that this is a very important desideratum in the application of the pressure from the platen to the top of the link to open the same, since it effects application of power in just the proper direction to move the eye of the link downwardly, spreading the same and still maintaining it in its vertical position, tilting it neither forwardly nor rearwardly during the operation, and which tilting would cause deformation of the link.

I find it important also to so dispose the anvil 21 that the horn 26 will be projected beyond the forward edge of the press base 3, so that below the horn, portions of the chain, including one of the side chains, may be accommodated. The opening pressure exerted upon the eye of the link will create an upper pressure against the shoulder 23 of the press frame and will not exert any appreciable pressure upon the bolts 24 to loosen the same. The link of the side chain, which is linked with the link 42, whose eye is being opened, may be disposed, as illustrated, at 48, during the process, in the embodiment of my invention, described.

Figure 10:
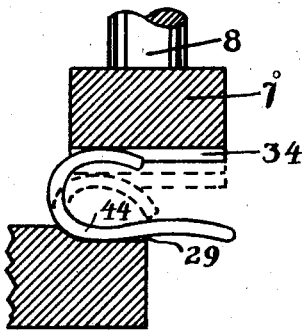
Fig. 10 is a section of the plunger and anvil taken in the plane of Fig. 5 on the machine of Fig. 1 with an interposed link eye shown as being operated upon thereby.

Fig. 9 is illustrative of the chain link 42 whose eye 44 is adapted to be opened and closed by virtue of the operation of my improved machine. Figs. 8 and 10 are illustrative of the closing operation, and in performing this operation the chain link 42 is positioned, as shown in Fig. 8, with its two eye portions positioned within the grooves 34 of the platen 7 and within the grooves 29 and 30 of the anvil. The plunger 8 being moved downwardly, will cause the eye 44 to be reclosed, as indicated by dotted lines in Fig. 10, the platen being moved from its solid line position to the dotted line position of Fig. 10, meanwhile. It will be understood that in these operations, downward movement of the platen is effected by a rotative movement of the cam 14, by virtue of manual movement imparted upon the handle 15.

Referring now to that embodiment of my invention illustrated in Figs. 6 and 7, it will be understood that the platen 70 thereof will be substituted for the platen 7 in the press of Fig. 1, and that the anvil 210 thereof will be substituted for the anvil 21 of the press of Fig. 1. In this embodiment of my invention, the platen contains preferably two longitudinal grooves 51 and 52 adapted to be positioned over the grooves 53 and 54 of the anvil, and which latter anvil grooves extend from the rear face 55 of the V-groove 250, rearwardly, toward the rearwardly extending portion 220 of the platen. In this embodiment of my invention, the opening operation is conducted upon the chain link eye in the same manner as has been described for the embodiment of my invention, of Figs. 1 to 5, inclusive, and 8 to 10, inclusive, and the closing operation is similarly conducted, except that the different positioning of the grooves 53 and 54, of Fig. 7, from the grooves 30 and 29, of Figs. 1, 5, 8 and 10, involves a somewhat different positioning of the link whose eyes are to be closed. In such a case, it will be understood that a link such as the one shown at 42, Fig. 9, will be placed between the platen and the anvil with its eyes projected rearwardly into the grooves 53 and 54 beyond the wedge edge 57 of the horn 260, and a portion of the link intermediate the bridge 56 and the eyes 44 will rest upon such wedge edge during the eye-closing operation.

It will be observed that in this embodiment of my invention, the grooves 51 and 53 on the one hand and 52 and 54 on the other being disposed on opposite sides of the plane of the plunger axis will effect a balancing of the forces imparted along the line of such axis, so that the plunger will be reciprocated with less effort than would otherwise be the case. It will be understood, however, that in this embodiment of my invention, the platen 70 will not only extend forwardly beyond the plane of the face 71 of the anvil but will extend rearwardly beyond a plane parallel thereto and including the rear portions 58 of the grooves 53 and 54, so that the same platen may be effective for both eye-closing and eye-opening operations. Both embodiments of my invention comprise in a single machine, a chain link eye-opener and eye-closer and without the necessity of substituting different anvils or different platens or equivalent opposing jaws therefor, since the jaws of the machine embodying my invention comprise portions suitably formed for both of these functions.

Whenever it is desired to increase the downward thrust of the platen 7 in the machine of my invention, it is unnecessary to substitute a different platen or a different lever arm or cam therefor, but this may be accomplished by placing the shim or liner element 61, having a squared key projection 62, between the lower face of the cam 14 and the upper face of the plunger rod head 10, as is illustrated in Figs. 11 and 12. In Fig. 2, I show the head 10 with its flange 11 and squared opening 12 therethrough in longitudinal alignment with the shim or liner 61 with the squared key 62 projecting therefrom ready to enter the opening 12. In Fig. 11, I show the plunger rod 7 with the head 10 affixed thereto and secured by the pin 20 and the shim or liner 61 in position between the lower cam face and the head 10, with the key 62 projected within the squared opening 12 of the head; and in Fig. 12, I show an elevational view of these parts shown in section in Fig. 11 but with the cam 14 rotated about its center 38 to depress the plunger rod 8 to the maximum amount permissible by the use of a shim of the thickness illustrated at 61.

I may provide a plurality of these shims, but I find that in practice a single shim may be provided, of such a thickness that using the press with and without this shim, substantially all sizes of chain links may be operated upon efficiently and without providing more than one of these shims.

Having thus described my invention in certain embodiments, I am aware that numerous and extensive departures may be made from the embodiments herein illustrated and described but without departing from the spirit of my invention.

I claim:

1. In a machine adapted to open the eyes of chain links, the combination with a press frame having a bed and a head, of an anvil positioned upon the bed and a plunger adapted to reciprocate toward and away therefrom, said plunger comprising a platen, said anvil comprising an upwardly extending horn adjacent one of its sides, said horn being substantially wedge-shaped and having one of its sides common to the adjacent side of the anvil, being disposed in a substantially vertical plane, and a recess provided in such side, said recess extending downwardly from a point spaced from the upper edge of the horn, said recess adapted to receive an adjacent link portion to the link whose eye is being opened during the eye-opening process, said last link being so positioned upon the horn that the edge thereof projected within the opening of the link with the topmost portion of the link will lie in substantially the plane of the said anvil side.

2. In a chain link tool, the combination with a press frame, comprising a head and a base, said base comprising a bed portion, an anvil seated on the said bed portion, a reciprocable plunger journaled in the head and movable towards and away from said anvil, said anvil comprising a forwardly disposed wedge horn and an anvil face portion laterally disposed from the said horn also in the forward portion of the anvil, said anvil face portion being grooved, said plunger having its lower face grooved, said anvil groove being disposed in vertical alignment opposite a groove of the plunger, said pair of grooves adapted to receive a chain link eye portion and adapted to compress the said link portion to close the eye when the plunger is moved toward the anvil, said horn having a wedge face disposed in a vertical plane, said plunger having a portion extending forwardly of the plane of said vertical face.

3. In a chain link tool, the combination with a press frame, comprising a head and a base, said base comprising a bed portion, an anvil seated on the said bed portion, a reciprocable plunger journaled in the head and movable towards and away from said anvil, said anvil comprising a forwardly disposed wedge horn and an anvil face portion laterally disposed from the said horn also in the forward portion of the anvil, said anvil face portion being grooved, said plunger having its lower face grooved, said anvil groove being disposed in vertical alignment opposite a groove of the plunger, said pair of grooves adapted to receive a chain link eye portion and adapted to compress the said link portion to close the eye when the plunger is moved toward the anvil, said wedge-shaped horn having a face common to a side of the anvil, and a recess in such face adapted to receive a chain link portion linked to the link whose eye is adapted to be operated upon by the wedge horn to permit the said link to be operated upon to be positioned upon the horn, so that its uppermost surface engageable by the plunger upon eye-opening movements thereof will be substantially disposed directly between the center of the platen and the wedge horn.

4. In a chain link tool, the combination with a press frame, comprising a head and a base, said base comprising a bed portion, an anvil seated on the said bed portion, a reciprocable plunger journaled in the head and movable towards and away from said anvil, said anvil comprising a forwardly disposed wedge horn and an anvil face portion laterally disposed from the said horn also in the forward portion of the anvil, said anvil face portion being grooved, said plunger having its lower face grooved, said anvil groove being disposed in vertical alignment opposite a groove of the plunger, said pair of grooves adapted to receive a chain link eye portion and adapted to compress the said link portion to close the eye when the plunger is moved toward the anvil, said horn having a wedge face disposed in a vertical plane, said plunger having a portion extending forwardly of the plane of said vertical face, said anvil comprising a forward portion extending forwardly beyond the press base bed.

5. In a chain link tool, the combination with a press frame, comprising a head and a base, said base comprising a bed portion, an anvil seated on the said bed portion, a reciprocable plunger journaled in the head and movable towards and away from said anvil, said anvil comprising a forwardly disposed wedge horn and an anvil face portion laterally disposed from the said horn also in the forward portion of the anvil, said anvil face portion comprising a groove, said plunger having a lower grooved face, said anvil groove being disposed in vertical alignment opposite a groove of the plunger, said pair of grooves adapted to receive a chain link eye portion and adapted to compress the said link portion to close the eye when the plunger is moved toward the anvil, said horn having a wedge face disposed in a vertical plane, said plunger having a portion extending forwardly of the plane of said vertical face, said anvil comprising a forward portion extending forwardly beyond the press base bed and comprising a rearward portion recessed in the press frame below a shoulder thereof and contacting with the lower face of said shoulder, whereby said shoulder will resist upward movements of the anvil portion contacting therewith whenever downward pressures are exerted on the horn in the opening or closing of a chain link eye carried on the forward portion of the anvil.

6. In a machine adapted to open the eyes of chain links, the combination with a press frame having a bed and a head, of an anvil positioned upon the bed and a plunger adapted to reciprocate toward and away therefrom, said plunger comprising a platen, said anvil comprising an upwardly extending horn adjacent one of its sides, said horn being substantially wedge-shaped and having one of its sides common to the adjacent side of the anvil, being disposed in a substantially vertical plane, and a recess provided in such side, said recess extending downwardly from a point spaced from the upper edge of the horn, said recess adapted to receive an adjacent link portion to the link whose eye is being opened during the eye-opening process, said last link being so positioned upon the horn that the edge thereof projected within the opening of the link with the topmost portion of the link will lie in substantially the plane of the said anvil side, said anvil having a pair of parallel grooves on its lower face adapted to receive the two parallel arm portions of the chain link operated upon said grooves, positioned over the said horn which extends with its edge transversely of the grooves.

7. In a machine adapted to open the eyes of chain links, the combination with a press frame having a bed and a head, of an anvil positioned upon the bed and a plunger adapted to reciprocate toward and away therefrom, said plunger comprising a platen, said anvil comprising an upwardly extending horn adjacent one of its sides, said horn being substantially wedge-shaped and having one of its sides common to the adjacent side of the anvil, being disposed in a substantially vertical plane, and a recess provided in such side, said recess extending downwardly from a point spaced from the upper edge of the horn, said recess adapted to receive an adjacent link portion to the link whose eye is being opened during the eye-opening process, said last link being so positioned upon the horn that the edge thereof projected within the opening of the link with the topmost portion of the link will lie in substantially the plane of the said anvil side, and a spring adapted to return the plunger to normal position after a movement thereof toward said anvil.

8. In a machine adapted to open the eyes of chain links, the combination with a press frame having a bed and a head, of an anvil positioned upon the bed and a plunger adapted to reciprocate toward and away therefrom, said plunger comprising a platen, said anvil comprising an upwardly extending horn adjacent one of its sides, said horn being substantially wedge-shaped and having one of its sides common to the adjacent side of the anvil, being disposed in a substantially vertical plane, and a recess provided in such side, said recess extending downwardly from a point spaced from the upper edge of the horn, said recess adapted to receive an adjacent link portion to the link whose eye is being opened during the eye-opening process, said last link being so positioned upon the horn that the edge thereof projected within the opening of the link with the topmost portion of the link will lie in substantially the plane of the said anvil side, said base comprising a portion adapted to rest upon the upper surface of a bench board, and an arm depending from its forward portion and comprising a rearwardly extending end portion disposed parallel to the first said base portion but spaced therefrom, and a clamp jaw secured to the last named arm portion and adjustable relative thereto to clamp the press base to the bench board.

9. In a chain tool for opening and closing the eyes of a cross-chain link of anti-skid chains, comprising a pair of jaws, one of the said jaws a stationary jaw, and the other said jaw being movable relative to the stationary jaw, means for moving the movable jaw, said stationary jaw having a recess extending transversely partly across the upper face of the same, a wedge shaped horn extending upwardly from the recess and a plurality of grooves in the upper surface of the jaw and disposed at one side of the recess, said movable jaw having a plurality of grooves disposed above said first mentioned grooves, said grooves in the movable jaw adapted to engage the link and hold the same when the jaws are moved towards each other.

10. In a chain tool for opening and closing the eyes of a cross-chain link of anti-skid chains, a pair of jaws, one of said jaws a stationary jaw and the other said jaw movable relative to the stationary jaw, means for moving the movable jaw, said stationary jaw having a recess extending transversely on the upper face, a wedge shaped horn extending upwardly from the recess, and a groove in the horn, said groove adapted to receive and retain a link while an adjoining link is mounted on the horn in direct alignment with the thrust of the movable jaw.

In testimony whereof I hereunto affix my signature this 23rd day of February, 1926.

JAMES WEBB SAFFOLD.